E. SACHS.
GRINDING MACHINE.
APPLICATION FILED MAY 13, 1908.

918,770.

Patented Apr. 20, 1909.

Witnesses:
M. A. Jones
Edward R. Whitman

Inventor
Ernst Sachs
By Julius C. Powell
his Attys.

UNITED STATES PATENT OFFICE.

ERNST SACHS, OF SCHWEINFURT, GERMANY.

GRINDING-MACHINE.

No. 918,770.    Specification of Letters Patent.    Patented April 20, 1909.

Application filed May 13, 1908. Serial No. 432,708.

*To all whom it may concern:*

Be it known that I, ERNST SACHS, a subject of the King of Bavaria, residing at No. 24 Schultes street, Schweinfurt, in Germany, have invented new and useful Improvements in Grinding-Machines, of which the following is a specification.

This invention relates to radius grinding machines, more particularly for grinding grooves in the race rings of hardened steel for ball bearings, the machine being of the kind described in my application for patent, Serial Number 416,313, of which it is a modification.

The essential point of the invention is that the device which carries the work is given the oscillating movement which produces the cross section of the groove in the shape of an arc of a circle, and is adjusted in accordance with the radius of curvature, while the grinding wheel, apart from its rotation, receives only a movement of advance in accordance with the progress of the work and its wear. The object of this arrangement is to effect the adjustment by the work holder only, which has the advantage that, when a number of articles of the same dimensions are manufactured, the position of the work holder once adjusted, need not be altered, for the distance of the race groove from the axis of oscillation always remains the same, and the wear and the advance of the grinding wheel do not affect the accuracy of the work. Compared to devices with an oscillating grinding wheel, this arrangement has the advantage that an unskilled workman can grind the grooves with the accuracy required for ball bearings. Owing to the possibility of securely supporting it, a grinding wheel of a large diameter can be used, whereby the output of the machine is considerably increased. As the work holder can remain in its adjusted position even when the work is being replaced in it, all the causes liable to bring about variations in the dimensions of the articles manufactured are done away with, and more accurate work is done in a shorter time without any special attention being required.

In the accompanying drawing which forms a part of this specification, a construction according to this invention is illustrated by way of example.

Figure 1:
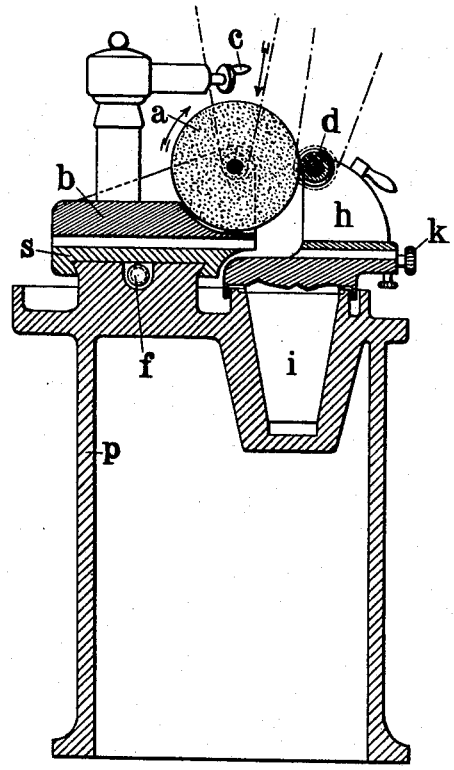
Figure 2:
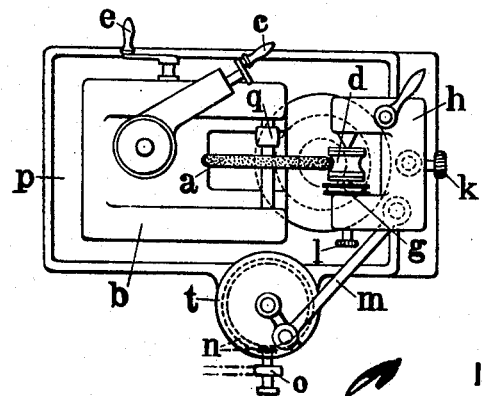

Figure 1 is a vertical longitudinal section, and Fig. 2 a plan of the grinding machine.

On the machine frame or standard $p$ is adjustable in suitable prismatic guides, by means of a screw spindle $f$ and crank handle $e$, a slide $s$ on which a transverse slide $b$ guided in the same manner, can be advanced or withdrawn by the handle $c$ through the intermediary of a worm gear and tooth rack or any other convenient gear in the well known manner, namely transversely of the axis of the grinding wheel $a$ mounted on the bracket $b$, while the slide $s$ enables the whole device to be moved in the longitudinal direction. On the spindle of the grinding wheel $a$ is mounted a driving pulley $q$ which is connected by a belt to a countershaft, as shown in Fig. 1 by dotted lines.

The work $d$ is fixed in any desired manner opposite the grinding wheel, for instance by means of a mandrel which is rotatably arranged between fixed points and is driven from a belt or cord pulley $g$ rotatably mounted on one of the said points, the said mandrel being connected to it by suitable clutch devices which can be easily thrown out of gear. The cord pulley $g$ is driven from the countershaft. The bracket $h$ supporting the device for fixing the work, is mounted on a conical pin $i$ in suitable guides, so that it can be adjusted at right angles to the axis of the grinding wheel by means of a screw spindle $k$. A hand wheel $l$ on a displaceable bolt permits of the adjustment of the mandrel carrying the work, in the direction of its axis, in order to place the central plane of the groove coincident with the axis of oscillation. The movement of the bracket $h$ toward the grinding wheel gives the adjustment in accordance with the radius, for the circumference of the work is then set at a suitable distance from the vertical axis of the pin $i$, and therefore, from the axis of oscillation of the bracket $h$.

The pin $i$ carrying the oscillating work holder, is preferably mounted direct in the machine frame, and its dimensions and taper are such that it is held securely by its own weight in the correspondingly shaped recess, while it can easily rotate about its axis without jamming. The special arrangement in the machine body or frame gives the oscillating device a guide free from vibrations, which has a favorable effect on the accuracy of the work. If necessary, the pin $i$ could be secured in its position in a suitable manner, for instance by means of a spring, or positively, or it could be rotatably mounted in the machine frame by means of ball bearings.

The oscillating movement of the pin $i$ and the work holder, can be effected in any suitable manner, for instance by hand, or by a mechanical gear. The latter is constituted in the construction illustrated by a crank disk $t$ connected to the bracket $h$ by means of a rod $m$, the said crank being rotated by the countershaft with the assistance of a belt pulley $o$ and of a bevel wheel gear $n$. It is preferable to use a clutch which would enable the said driving gear to be disconnected, in order to enable the oscillating device to be stopped at times, for instance when replacing the work. The crank pin with which the rod $m$ is engaged is adjustable on the disk $t$ in the radial direction in order that the work holder could swing according to the requirements, to a greater or smaller angle. The grinding wheel $a$ is preferably provided with a protecting hood, not shown in the drawing, which, when cooling is necessary, is provided with supply pipes for furnishing a jet of water for the work. The machine frame $p$ is then provided with a collecting trough from which the rinsing water is again discharged in the usual manner.

The working of the machine is as follows. After the work $d$ which is already provided with a circumferential groove, but has to be ground or finished to the exact measurements, has been secured to a mandrel, the latter is inserted between the points of the bracket $h$, the clutch device connecting it simultaneously to the pulley $g$. By suitably adjusting the work carrier in the longitudinal and transverse directions by means of the respective adjusting devices $l$ and $k$, the work is brought into such position that it is exactly opposite the grinding wheel, and its circumference is at that distance from the axis of oscillation of the pin $i$ which is equal to the desired radius, that is to say, the cross section of the groove is made in the shape of the desired arc of a circle, as soon as the given depth of grinding, and, therefore, the required diameter of the ring has been reached or obtained. This is easily ascertained by measuring it by means of a gage. The grinding wheel $a$ is first adjusted by means of the longitudinally displaceable slide $s$ in such manner that the axis of the pin $i$ comes to lie in its central plane, whereupon, by shifting the transversely movable slide $b$ it is advanced to such an extent that its circumference touches the work, and during the working of the machine it grinds the groove in the work which is rotating and simultaneously swinging to and fro. If necessary, a small further advance is made in accordance with the depth of the treatment, or the wear of the grinding wheel. After the work has been completed, and the driving devices for the work and the oscillating appliance stopped, the transverse support $b$ is withdrawn, whereupon the work is released from the bracket $h$, and another piece of the same dimensions can be placed on the mandrel. After the latter has been inserted, there is no need to make another adjustment, but after the advance of the grinding wheel, and after throwing into gear the device, the work can begin at once, as all the parts are at their correct relative positions. As the extent of the treatment is given by the position of the work holder which remains without any change, and the advance of the grinding wheel does not require any special attention, the attendance on the machine, after the first adjustment, is limited merely to replacing the work, throwing the driving mechanism in and out of gear and to bringing the grinding wheel in contact so that one man can attend to several such machines. Nevertheless, owing to the automatic working of the machine, very accurate work is obtained as regards uniformity of the articles treated.

What I claim as my invention, and desire to secure by Letters Patent, is—

1. In a grinding machine for forming race grooves of ball bearings, the combination with a rotating grinding wheel, of a pivotally supported rotating work carrier, the axis of said pivot extending in a plane perpendicular to and between the axes of said wheel and carrier, and mechanically actuated means for oscillating the work carrier.

2. In a grinding machine for forming race grooves of ball bearings, the combination with a rotating grinding wheel, of a pivotally supported rotating work carrier placed in front of the grinding wheel, the axes of said wheel and carrier being arranged in parallel planes, and mechanically actuated means for oscillating the work carrier.

3. In a grinding machine for forming race grooves of ball bearings, the combination with a pivotally supported rotating work carrier, of a rotating grinding wheel having its axis parallel with the axis of said wheel and adjustable in front of the work, and mechanically actuated means for oscillating the work carrier.

4. In a grinding machine for forming race grooves of ball bearings, the combination with a rotatable work carrier pivotally supported, the axis of rotation being at right angles to the axis of oscillation, of a rotating grinding wheel arranged with its axis parallel with the axis of the work carrier, the axis of said pivot extending in a plane intermediate the axes of said wheel and carrier and means for oscillating the work carrier.

5. In a grinding machine for forming race grooves of ball bearings, the combination with a rotating grinding wheel, of a rotating work carrier having its axis parallel with and in rear of the axis of said wheel, a pivot supporting the work carrier, and means for oscillating the said work carrier, the axis of said pivot extending in a plane intermediate the axes of said wheel and carrier.

6. In a grinding machine for forming race grooves of ball bearings, the combination with a machine frame or standard having a socket and a pivot seated therein and capable of oscillating on its seat, of a rotatable work carrier mounted upon and supported by the pivot and being adjustable with respect to the axis of oscillation of the said pivot, a rotating grinding wheel adjustably arranged with respect to the axis of oscillation in front of the work carrier, and means for oscillating the pivot.

7. In a grinding machine for forming race grooves of ball bearings, the combination with a conical pivot capable of oscillating in a conical seat, of a rotatable work carrier supported by the said pivot, a rotatable grinding wheel, and means for oscillating the pivot and the work carrier.

8. In a grinding machine for forming race grooves of ball bearings, the combination with a conical pivot, of a corresponding conical seat in the standard of the machine, the said pivot being capable of oscillating in its seat and maintained therein by its weight, a rotatable work carrier supported by the said pivot, a rotatable grinding wheel, and means for oscillating the pivot and the work carrier.

In testimony whereof I have set my signature to this specification in the presence of two subscribing witnesses.

ERNST SACHS.

Witnesses:
FRANZ STROHMER,
ROBERT W. HEINGARTNER.